United States Patent
Lloyd et al.

(10) Patent No.: US 6,200,924 B1
(45) Date of Patent: Mar. 13, 2001

(54) POROUS HIGHLY FLUORINATED ACIDIC POLYMER CATALYST

(75) Inventors: Ralph Birchard Lloyd, Fayetteville, NC (US); Edward George Howard, Jr., Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/491,394

(22) Filed: Jan. 26, 2000

Related U.S. Application Data

(60) Provisional application No. 60/117,699, filed on Jan. 29, 1999.

(51) Int. Cl.$^7$ .............................. B01J 31/06; B01J 31/08; B01J 31/10; C08J 5/20
(52) U.S. Cl. ................. 502/159; 521/25; 521/28
(58) Field of Search ................ 502/159; 521/25, 521/28

(56) References Cited

U.S. PATENT DOCUMENTS

| | | | |
|---|---|---|---|
| 3,282,875 | 11/1966 | Connolly et al. | 260/29.6 |
| 4,180,695 | * 12/1979 | McClure | 585/730 |
| 4,358,545 | 11/1982 | Ezzell et al. | 521/27 |
| 4,940,525 | 7/1990 | Ezzell et al. | 204/252 |
| 5,430,212 | 7/1995 | Butt et al. | 585/526 |
| 5,824,622 | 10/1998 | Harmer et al. | 502/407 |

FOREIGN PATENT DOCUMENTS

94/28059 * 12/1994 (WO).
96/19288 * 6/1996 (WO).

OTHER PUBLICATIONS

Francis J. Waller et al., Catalysis with Nafion, *Chemtech*, pp. 438–441, Jul. 1987.

\* cited by examiner

Primary Examiner—Elizabeth D. Wood

(57) ABSTRACT

A solid acid catalyst comprising porous highly fluorinated acidic polymer and process for manufacturing it. The catalyst comprises at least about 90 wt. % highly fluorinated acidic polymer and has a surface area of about 0.01 $m^2/g$ to about 5 $m^2/g$.

11 Claims, 2 Drawing Sheets

POROUS HIGHLY FLUORINATED ACIDIC POLYMER CATALYST

RELATED APPLICATION

This application claims benefit of U.S. Provisional Application No. 60/117,699, filed Jan. 29, 1999.

FIELD OF THE INVENTION

The present invention relates to solid acid catalysts and more particularly relates to a porous highly fluorinated acidic polymer catalyst and a process for its manufacture.

BACKGROUND OF THE INVENTION

Perfluorinated sulfonic acid polymer is known for use as an acid catalyst in a variety of chemical reactions (F. J. Waller, et al. *Chemtech,* July 1982, pp. 438–441). The polymer is used in a variety of physical forms, including powder, particles and pellets in a range of sizes and shapes, films, and tubes. High surface area is generally desirable to facilitate contact of the polymer with the material or materials with which it interacts, and to make most efficient use of the polymer. Surface area can be increased by more finely dividing the solid polymer, or by using the polymer on or in a substrate as described in U.S. Pat. Nos. 5,430,212 and 5,824,622. Finely divided polymer can pack and obstruct flow in continuous processes in which reactants pass through a catalyst bed. Carry-over of fines and resulting downstream contamination is also a problem. Cleaning spent polymer is complicated by these same factors. By combining the polymer with a substrate, high surface area may be achieved without finely dividing the polymer. However, the substrate can interact with the strongly acid polymer and affects its activity. Separation of polymer from the substrate, and attrition of the substrate during use are also problems.

New forms of perfluorinated sulfonic acid catalyst are needed which have high surface area but avoid the problems inherent in finely divided polymer or polymer-on-substrate forms of catalyst.

SUMMARY OF THE INVENTION

In accordance with the invention, a solid acid catalyst is provided which comprises porous highly fluorinated acidic polymer. The catalyst is comprised of at least about 90 wt. % highly fluorinated acidic polymer and has a surface area of about 0.01 m$^2$/g to about 5 m$^2$/g. Preferably, the catalyst is substantially free of pores having a size of about 1.7 to about 300 nm as measured by the BET absorption method. Preferably, the highly fluorinated acidic polymer is highly fluorinated sulfonic acid polymer.

In accordance with a process for making a solid acid catalyst in accordance with the invention, highly fluorinated acidic polymer or precursor thereof is exposed to a pressurized fluid to produce fluid-swelled polymer or polymer precursor. The fluid-swelled polymer or polymer precursor is heated to a temperature above the softening point of said fluid-swelled polymer or precursor. The pressure of the pressurizing fluid is then reduced sufficiently quickly that gases escape from said fluid-swelled polymer and the escaping gases expand said polymer or polymer precursor into a porous structure. The polymer or polymer precursor is cooled to at least partially retain the porous structure.

DETAILED DESCRIPTION

Figure 1:
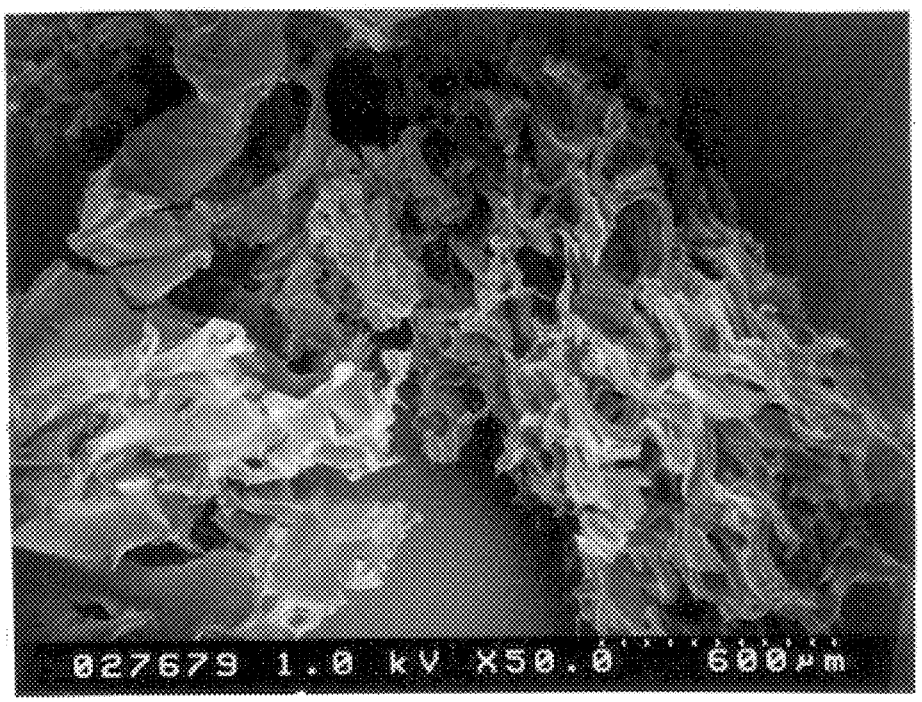
FIGS. 1 and 2 are photomicrographs at 50× and 500×, respectively, of a preferred catalyst in accordance with the present invention prepared according to the procedure described in Example 1.

The solid acid catalyst in accordance with the invention contains highly fluorinated acidic polymer. "Highly fluorinated" means that at least 90% of the total number of univalent atoms in the polymer are fluorine atoms. Most preferably, perfluorinated acidic polymers are used. The highly fluorinated acidic polymers useful for the present invention include polymers with acidic functional groups including sulfonic, carboxylic, phosphonic, imide, sulfonimide and sulfonamide groups. Preferably, polymers containing sulfonic acid groups are used because of their strongly acidic character and ready commercial availability.

Preferably, the solid acid catalyst contains at least about 90 wt. % and, more preferably 95 wt. %, highly fluorinated acidic polymer. In the most preferred form of the invention, the solid acid catalyst consists essentially of highly fluorinated acidic polymer.

In preferred polymers for use in accordance with the invention, the polymers comprise a polymer backbone with recurring side chains attached to the backbone with the side chains carrying the cation exchange groups. In use the polymers should be principally in the acid form, that is, the proton or hydrogen ion form, though some cation exchange groups may be in the salt form, that is, associated with cations other than the proton or hydrogen ion. Especially preferred are polymers in which the side chains are fluorinated as this enhances the acidity of the ion exchange group. Highly fluorinated and perfluorinated acidic polymers for use in accordance with the invention can be homopolymers or copolymers of two or more monomers. Copolymers are typically formed from one monomer that is a nonfunctional monomer and which provides carbon atoms for the polymer backbone. A second monomer provides both carbon atoms for the polymer backbone and also contributes the side chain carrying the cation exchange group or its precursor, e.g., a sulfonyl halide group such as sulfonyl fluoride (—SO$_2$F), which can be subsequently hydrolyzed and acid exchanged to a sulfonic acid group. For example, copolymers of a first fluorinated vinyl monomer together with a second fluorinated vinyl monomer having a sulfonyl fluoride group (—SO$_2$F) can be used. By fluorinated vinyl monomer is meant a molecule with a carbon-carbon double bond in which there is at least one fluorine atom attached to a carbon atom which is doubly bonded to another carbon atom. Possible first monomers include tetrafluoroethylene (TFE), hexafluoropropylene, vinyl fluoride, vinylidine fluoride, trifluoroethylene, chlorotrifluoroethylene, perfluoro(alkyl vinyl ether), and mixtures thereof. Possible second monomers include a variety of fluorinated vinyl ethers with sulfonate ion exchange groups or precursor groups which can provide the desired side chain in the polymer. The first monomer may also have a side chain which does not interfere with the ion exchange function of the sulfonate ion exchange group. Additional monomers can also be incorporated into these polymers if desired.

A class of especially preferred polymers for use in the present invention includes a highly fluorinated, most preferably perfluorinated, carbon backbone and the side chain is represented by the formula —(O—CF$_2$CFR$_f$)$_a$—O—

$CF_2CFR'_fSO_3X$, wherein $R_f$ and $R'_f$ are independently selected from F, Cl or a perfluorinated alkyl group having 1 to 10 carbon atoms, a=0, 1 or 2, and X is entirely or largely H, but may include minor amounts of Li, Na, K or $N(R^1)(R^2)(R^3)(R^4)$ and $R^1, R^2, R^3$, and $R^4$ are the same or different and are H, $CH_3$ or $C_2H_5$. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and a side chain represented by the formula —O—$CF_2CF(CF_3)$—O—$CF_2CF_2SO_3X$, wherein X is as defined above. Polymers of this type are disclosed in U.S. Pat. No. 3,282,875 and can be made by copolymerization of tetrafluoroethylene (TFE) and the perfluorinated vinyl ether $CF_2$=CF—O—$CF_2CF(CF_3)$—O—$CF_2CF_2SO_2F$, perfluoro(3,6-dioxa-4-methyl-7-octenesulfonyl fluoride) (PDMOF), followed by conversion to sulfonate groups by hydrolysis of the sulfonyl halide groups and ion exchanging to convert to the desired hydrogen ion form. One preferred polymer of the type disclosed in U.S. Pat. Nos. 4,358,545 and 4,940,525 has the side chain —O—$CF_2CF_2SO_3X$, wherein X is as defined above. This polymer can be made by copolymerization of tetrafluoroethylene (TFE) and the perfluorinated vinyl ether $CF_2$=CF—O—$CF_2CF_2SO_2F$, perfluoro(3-oxa-4-pentenesulfonyl fluoride) (POPF), followed by hydrolysis and acid exchange. Perfluorosulfonic acid polymers of the types described in this paragraph are sold under the trademark Nafion® by E.I. du Pont de Nemours, & Co., Inc. of Wilmington, Del., USA.

The ratio of the monomers with the ion exchange groups to other monomers that make up the polymer determines the acidity of the polymer, that is the equivalents of base, such as sodium hydroxide, that will be neutralized by one gram of polymer. It is convenient to describe and compare the polymers in terms of their "ion exchange ratio" or "IXR". This is defined as the number of carbon atoms in the polymer backbone in relation to the number of cation exchange groups. A wide range of IXR values for the polymer is possible. Typically, however, the IXR range used is from about 7 to about 33. For perfluorinated polymers of the type described above, the cation exchange capacity of a polymer is often expressed in terms of equivalent weight (EW). For the purposes of this application, equivalent weight (EW) is defined to be the weight of the polymer in acid form required to neutralize one equivalent of NaOH. In the case of a sulfonate polymer where the polymer comprises a perfluorocarbon backbone and the side chain is —O—$CF_2$—$CF(CF_3)$—O—$CF_2$—$CF_2$—$SO_3H$, the equivalent weight range which corresponds to an IXR of about 7 to about 33 is about 700 EW to about 2000 EW. IXR for this polymer can be related to equivalent weight using the following formula: 50 IXR+344=EW. While generally the same IXR range is used for sulfonate polymers disclosed in U.S. Pat. Nos. 4,358,545 and 4,940,525, the equivalent weight is somewhat lower because of the lower molecular weight of the monomer unit containing a cation exchange group. For the IXR range of about 7 to about 33, the corresponding equivalent weight range is about 500 EW to about 1800 EW. IXR for this polymer can be related to equivalent weight using the following formula: 50 IXR+178=EW.

IXR is used in this application to describe either hydrolyzed polymer which contains ion exchange groups or unhydrolyzed polymer (also referred to as "precursor" or "precursor polymer") that contains precursor groups which will subsequently be converted to the acidic form during the manufacture of the catalyst.

Figure 2:
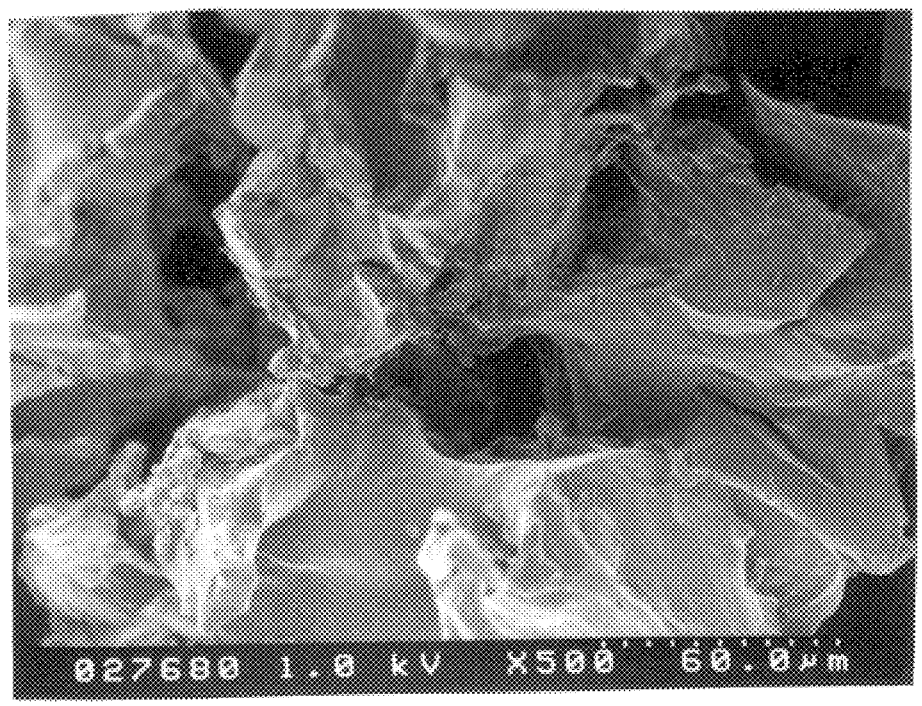
Figure 3:
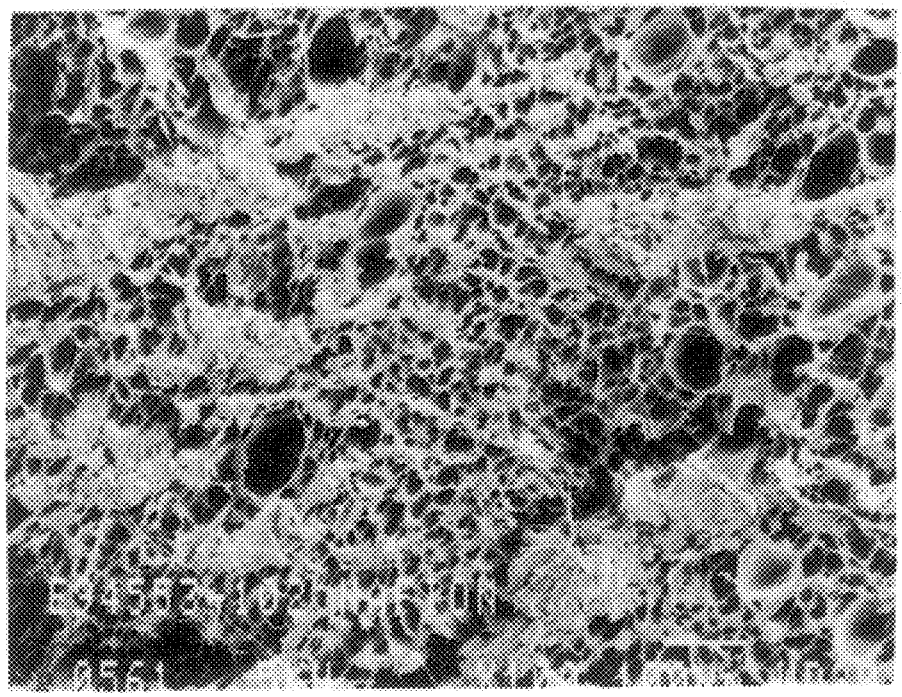
FIGS. 3 and 4 are photomicrographs at 50× and 500×, respectively, of a preferred catalyst in accordance with the present invention prepared according to the procedure described in Example 2.
Figure 4:
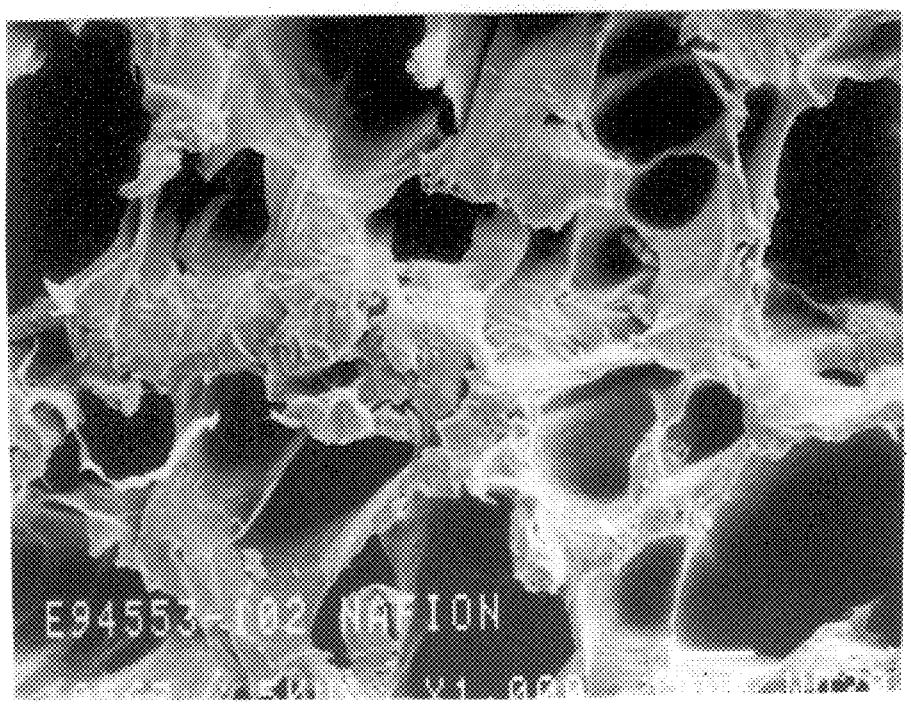

As illustrated in FIGS. 1–4 for two preferred catalysts in accordance with the invention, the catalyst has a very open structure which provides a high surface area. In the catalyst of the invention, the surface area is about 0.01 $m^2/g$ to about 5 $m^2/g$, preferably 0.1 $m^2/g$ to 5 $m^2/g$. Depending on the process conditions used in its manufacture, the surface area can be adjusted as desirable for a particular end use. As may be seen in the structure of the catalyst shown in FIGS. 1 and 2, the structure may have a more leaf-like structure which, in the catalyst depicted, provides a surface area of 0.01–0.05 $m^2/g$. The structure of the catalyst has more of an open cell foam appearance in the embodiment depicted in FIGS. 3 and 4 which provides a surface area of 1–5 $m^2/g$. Surface areas are measured using the BET method.

In addition, the catalyst is preferably substantially free of pores having a size of about 1.7 to about 300 nm as measured by the BET absorption method. When the BET procedure is run on samples of this form of the catalyst, the results indicate that there are essentially no pores in this size range. This form of the catalyst of the invention is especially useful for processes involving reactions forming oligomers or for feedstocks containing materials which can clog small pores.

Preferably, the solid acid catalyst has a bulk density of about 0.1 to 0.9 g/cc.

Preferred solid acid catalysts in accordance with the invention have a resiliency factor of 80%. Resiliency factor a measure of how well the catalyst recovers after being subjected to pressing or other mechanical distortions of its structure. These preferred catalysts are able to withstand rough handling during manufacture, use and regeneration. The catalysts are also dimensionally stable. By dimensionally stable is meant that the catalysts do not change in any dimension by greater to 10% when heated to 100° C. and cooled.

In the process for making a solid acid catalyst in accordance with the invention, highly fluorinated acidic polymer or precursors thereof is exposed to a pressurized fluid to produce fluid-swelled polymer or polymer precursor. Any of a wide variety of such fluids can be used provided that they are capable of swelling the polymer of the precursor. Under the pressures used, the fluid may be in the form of a liquid, a gas or a supercritical fluid. Any suitable vessel may be used which can withstand the pressures employed. Such vessels should be acid resistant when the polymer is in the acid form since it is corrosive. The pressure used should to swell the polymer with sufficient fluid so that it expands as desired in the later steps of the process.

For perfluorinated sulfonic acid polymer, the polymer is advantageously employed in either acid or sulfonyl halide precursor form. When sulfonyl halide, e.g., sulfonyl fluoride, the fluid is preferably selected from the group consisting of $SO_2$ and $CO_2$. For sulfonic acid polymer, the fluid is preferably selected from the group consisting of $SO_2$ and $CO_2$, with the fluid further comprising water.

In the process of the invention, the fluid-swelled polymer or polymer precursor is heated to a temperature above the softening point of said fluid-swelled polymer or precursor. For perfluorinated sulfonyl fluoride polymer, this temperature is typically in the range or 150–300° C. and the temperature used in the process is somewhat lower due to softening point depression caused by the swelling fluid. Perfluorinated sulfonic acid polymer has a somewhat higher softening point range and its softening point will be similarly affected. The pressure of the pressurizing fluid is then reduced sufficiently quickly that gases escape from said fluid-swelled polymer and the escaping gases expand said polymer or polymer precursor into a porous structure. If the fluid is a liquid or a supercritical fluid, a phase change will occur to provide the gases to expand the polymer.

The polymer or polymer precursor is cooled to at least partially retain the porous structure. It is preferable in the process for the cooling of the polymer or polymer precursor to at least partially retain the porous structure to be caused by said reduction in pressure. Consequently, it is advantageous for the fluid swelled polymer, at the time of pressure release, to be only slightly above the softening point of the swelled polymer so that the structure imparted by the escaping gases will be quickly "frozen" by the temperature drop caused by the expanding gases.

Typically, the processes yield a mass of porous polymer which can be cut or broken into particles of the desired size. Alternatively, the porous polymer may be formed into a mold which impart a shape adapted for a particular end use.

When used in particulate form, the size of the catalyst particles can be adjusted to suit the equipment or process in which the catalyst is employed. Preferably, catalyst is in a form having an average particle size of at least about 0.5 mm, most preferably, at least about 1.0 mm. Since the porous polymer provides high surface area, the particles can be large, i.e., up to 50 mm, if desired. The porous highly fluorinated polymer of the invention combines the virtues of high surface area with the easy handling, including filling, charging, filtering, and cleaning, of large particle catalysts.

Another particular advantage of the highly fluorinated, and more especially the perfluorinated acidic organic polymers, is that they resist fouling because of their low surface energy. However, if fouled, they may be easily cleaned. Accumulation of organic material on the surface of the polymer catalyst can interfere with contact of the acidic organic polymer catalyst with the material being treated with the catalyst, and thereby slow reaction, and perhaps render it less complete. Also, should metal ion salts be present in the feedstock, they may reduce the activity of the acidic organic polymer catalyst. Because of their great chemical stability, the perfluorosulfonic acid acidic organic polymers may be cleaned by a wide variety of means consistent with the nature of the contamination. Those skilled in the art will be familiar with the various techniques, which include, steam cleaning, exposure to oxidizing agents such as chlorine, aqueous solutions of sodium or calcium hypochlorite, or hot nitric acid. Steaming has been found to be a preferred non-chemical method of cleaning the acidic organic polymers. For the removal of metal ion contamination, exposure to aqueous inorganic acids, preferably hydrochloric acid or nitric acid in the range of 1–10%, is desirable.

The catalysts made in accordance with this invention exhibit high activity and long life in a variety of reactions, including but not limited to, esterifications, alkylations, acylations, dimerizations, polymerizations, isomerizations, and conversion of organic sulfur compounds that are insoluble in aqueous or alkaline media to forms that are soluble in said media.

Test Methods

Test are run on catalyst in the hydrolyzed form.
BET Surface Area & Nitrogen Porosimetry: SA & N2-PVD The surface areas of powders and solids are calculated using the adsorption of nitrogen at its boiling point via the BET method [S. Brunauer, P. Emmett, and E. Teller, J. Amer. Chem. Soc. 60, 309 (1938)]. Micromeritics ASAP 2400 adsorption units are used to measure the amount of nitrogen sorbed; the BET equation is used to calculate the amount of nitrogen corresponding to a monolayer for a given sample. Using an area of 16.2 sq. Angstroms (0.162 nm$^2$) per nitrogen molecule, the surface area per gram of solid is calculated. Surface area standards (from the National Institute of Standards & Technology) are run periodically to insure that the reported values are accurate to within a few percent for samples with areas >5 m$^2$/g. The BET equation may be written in linear form:

$$P/P_o/V \cdot (1-P/P_o) = 1/c \cdot V_m + (c-1) \cdot P/P_o/c \cdot V_m$$

where the volume of nitrogen adsorbed, V, in cc STP/g, is measured as a function of relative pressure, $P/P_o$ where P is the measured pressure and $P_o$ is the pressure of condensing nitrogen at the temperature of the experiment, typically 77° K. Vm is the volume of an adsorbed monolayer and the constant c is related to the average heat of adsorption on the surface (hence, sometimes called a "surface energy" term). Both $V_m$ and c are found experimentally by fitting the linear portion of the adsorption isotherm, generally in the $P/P_o$ regime <0.3. Values of c vary significantly from material to material and, unless precautions are taken, there are sufficient variations in states of dehydration, surface chemistry, etc., so that the c values cannot readily be interpreted.

Pore size distributions:

Pore sizes are calculated using the BJH method [Barret, Joyner, and Halenda, J. Amer. Chem. Soc. 73,373 (1951)]. There are two important features of the BJH method:

cumulative pore volume (17–3000 Å (1.7–300 nm));
   record this value calculated pore volumes vs. pore diameters (pore distribution)

A cumulative volume >0.05 cc/g shows the presence of pores; the higher the value, the greater the contribution to the surface area to the calculated Cumulative Surface Area.
Resiliency Factor Resiliency Factor is measured slicing the catalyst sample into 0.5 inch (13 mm) (original thickness) thick pieces. One of the pieces is placed between two sheets of aluminum foil and pressed two times in a hydraulic press to a thickness of 5 to 10 mils (125 to 250 μm). The sample is removed from the press and, after two hours at room temperature, the thickness, defined here as the recovered thickness, is measured. Resiliency Factor is the recovered thickness divided by the original thickness and is expressed as a percentage.
Densities of products isolated from vessels:

Samples were cut from the products recovered from the pressure vessel. Their volumes were calculated and weights determined.

Sample A was prepared as in Example 3 using 50 g perfluorinated sulfonyl fluoride (EW 1080) and 150 g $CO_2$ at 260° C. The vessel was cooled to 240° C. before being vented. The product density was 0.48 g/ml.

Sample B was prepared like Sample A except the process was carried out at 250° C. and vented at 250° C. Its density was 0.14 g/ml.

EXAMPLE 1

Preparation of Porous Sulfonyl Fluoride Precursor Polymer from Sulfur Dioxide and Hydrolysis to the Sulfonic Acid Form A Hastelloy® shaker tube was charged with 50 g perfluorinated sulfonyl fluoride polymer of the type described in U.S. Pat. No. 3,282,875 (IXR=14, EW=1050) and 150 g sulfur dioxide. After heating and shaking at 250° C. for 3 hours at 2000 psi (14 mPa), the vessel was cooled to 245°

C. and vented. Because the vessel was completely filled with a soft porous plug, it is concluded that the perfluorinated sulfonyl fluoride polymer was completely dissolved in the sulfur dioxide. When the pressure was released, the solution foamed and filled the vessel as the sulfur dioxide escaped.

The large cells of the porous polymer were all open but there were some closed small cells on the walls that prevented the porous polymer from sinking in acetone.

The cylindrical product was sliced into 0.5 inch (13 mm) thick disks, then pressed two times between aluminum foil in a hydraulic press. At first, the disks were thin circles, but in 2 hours they recovered to the original 0.2 inch (13 mm) thickness. The disks were hydrolyzed in a solution consisting of 56% water, 30% dimethylsulfoxide, and 14% potassium hydroxide. The solution was forced into the spongy porous polymer by pressing it and allowing it to expand while under the surface of the solution. After heating on a steam bath for two hours, the solution and spongy porous polymer were stored at room temperature for two days. The disks had expanded and were stiff. Treatment with 600 ml 10:90 concentrated nitric acid:water solution, using the squeezing procedure to thoroughly distribute the acid throughout the structure, converted the porous polymer to the hydrogen ion or acid form. After four days, the product was repeatedly washed with deionized water, using the squeezing technique until the water was pH 6. The product was dried at room temperature for at least two days prior to testing for catalytic activity. Bulk density 0.14 g/ml.

EXAMPLE 2

Preparation of Porous Sulfonyl Fluoride Precursor Polymer from Carbon Dioxide

The reaction of Example 1 was repeated using 50 g perfluorinated sulfonyl fluoride polymer of the type described in U.S. Pat. No. 3,282,875 (IXR=13, EW=990) with 150 g carbon dioxide at 250° C. for 3 hours. A soft, small pore product equivalent to about one quarter of the vessel's volume resulted having a surface area of 4.4 m$^2$/g. Bulk density 0.18 g/ml.

EXAMPLE 3

Preparation of Porous Nafion® Sulfonic Acid Using Sulfur Dioxide and Water

A shaker tube made of Hastelloy®S C was charged with 54 g (0.05 mol) perfluorinated sulfonic acid polymer (IXR=16, EW 1080) and 3.6 g (0.2 moles) water. The vessel was charged with 150 g sulfur dioxide followed by heating and shaking at 250° C. under 2400 psi (156.6 MPa) for 3 hours. The gases were vented rapidly. The polymer was recovered as a porous strip. A section from the inside of the product sank slowly in acetone, demonstrating that it had an open structure. It had a gray color that was removed by soaking in 30% aqueous nitric acid. Bulk density 0.22.

EXAMPLES 4–12

Porous Perfluorinated Sulfonic Acid Preparations Using Carbon Dioxide

As summarized in the following Table 1, a variety of porous perfluorinated sulfonic acid compositions were prepared. All used pellets of the polymer in a shaker tube. After agitation for three hours, the vessels were rapidly vented and cooled to give porous strips of polymer. Some were covered with a thin layer of polymer film over an interior porous structure. As the ratio of water to carbon dioxide was increased, the pore size became smaller. Small strips of the products sank in acetone, indicating an open cell structure.

TABLE 1

Preparation of Porous Perfluorinated Sulfonic Acid

| Example | EW | Nafion ® Sulfonic Acid g | Water g | Temp ° C. | Time hrs | Pressure psi (MPa) |
|---|---|---|---|---|---|---|
| 4 | 1080 | 54 | 3.6 | 250 | 3 | 5400 (37.2) |
| 5 | 1080 | 27 | 1.8 | 250 | 3 | 5000 (34.5) |
| 6 | 1080 | 54 | 3.6 | 240 | 3 | 5100 (35.2) |
| 7 | 1080 | 81 | 5.4 | 240 | 3 | 5500 (37.9) |
| 8 | 1080 | 108 | 7.2 | 250 | 3 | 6200 (42.7) |
| 9 | 1080 | 54 | 9 | 250 | 3 | 5500 (37.9) |
| 10 | 1080 | 54 | 18 | 250 | 3 | 5000+ (34.5+) |
| 11 | 1080 | 54 | 36 | 250 | 3 | 5900 (40.7) |
| 12 | 915 | 55 | 4.4 | 250 | 3 | 5800 (40.0) |

The porous products were chopped to small pieces in a Wiley mill with the resin at room temperature and treated with 10–15% aqueous nitric acid to remove the metal contaminants sometimes contributed by the metal vessel. The final porous granules were tested as catalysts for alkylation, olefin rearrangement, and acylation reactions as described in the following examples.

CONDITIONS FOR EXAMPLES 13–18

Catalyst testing was carried out in the liquid phase with a glass batch reactor. The porous catalyst of this invention was that made in Example 10. "NR50" refers to Nafion® Superacid Catalyst NR50, available from the DuPont Company, Wilmington Del., USA. Prior to testing, the Nafion® resins were dried for more than 4 hours in a vacuum oven at 150° C. In the batch reactor, liquid samples were taken at certain time intervals and analyzed with GC. Occasionally, GC/MS and NMR were used for product analysis as well. Reaction rates are stated as millimoles of product formed per gram of catalyst per hour (mmole·gram-catalyst$^{-1}$·hr$^{-1}$).

EXAMPLE 13

Porous Perfluorinated Sulfonic Acid Catalysis of Olefin Isomerization

1-Dodecene isomerization: 1-Dodecene isomerization to its linear isomers was carried out in the liquid phase at 75° C. For a typical test, 10 g of 1-dodecene which was fresh distilled, 30 g of decane and 1 g of solid acid catalyst which was predried were charged into a two-neck flash with a magnetic stir bar for mixing. Decane serves as solvent and internal standard for the GC analysis. Liquid samples were taken atcertain time intervals and analyzed by GC. Very good material balances (>98%) were obtained and formation of oligomers was negligible under these conditions.

EXAMPLE 14

Rate of isomerization of 1-dodecene to the internal olefins at 80° C.

1-Dodecene isomerization rates were calculated from the data obtained at low 1-dodecene conversions (<30%) at conditions similar to those of the preceding example. Table 2 summarizes the results.

TABLE 2

| Catalyst | Rate (mmole · gram-catalyst$^{-1}$ · hr$^{-1}$) |
|---|---|
| NR50 | 3.8 |
| Porous Catalyst | 23.7 |

EXAMPLE 15

Porous Perfluorinated Sulfonic Acid Catalysis of Akylation p-Xylene alkylation with 1-dodecene was carried out at 80° C. The reaction mixture contained 10 g 1-dodecene, 21.9 g p-xylene and 1 g solid acid catalyst. The isomerization of the 1-dodecene to the internal olefins during the reaction leads to the formation of five alkylation products (2-, 3-, 4-, 5-, and 6-dodecyl-p-xylene).

EXAMPLE 16

Rates and Yields in Porous Perfluorinated Sulfonic Acid Catalyzed Akylation

Reaction rates and product yields after 60 min. for the alkylation of p-xylene with 1-dodecene at 80° C. (p-xylene/1-dodecene/perfluorosulfonic acid polymer pellets (3 mm–4 mm in size)=29.3/10.0/1.0 g) are summarized in Table 3.

TABLE 3

| Catalyst | Rate (mmole · gram-catalyst$^{-1}$ · hr$^{-1}$) | Yield (%) |
|---|---|---|
| NR50 | 1 | 1.7 |
| Porous Catalyst | 24.6 | 33.8 |

EXAMPLE 17

Porous Perfluorinated Sulfonic Acid Catalysis of an Acylation Reaction

Acylation of m-xylene with benzoyl chloride was carried out at 140° C. with 2 g catalyst, 14 g benzoyl chloride and 21.2 g m-xylene. The products are dimethylbenzophenones.

EXAMPLE 18

Rates and Yields in Porous Perfluorinated Sulfonic Acid Catalyzed Acylation

Reaction rates and product yields after 30 min. for acylation of m-xylene with benzoyl chloride at 140° C. (m-xylene/benzoyl chloride/perfluorosulfonic acid polymer pellets (3 mm–4 mm in size)=21.0/14.0/1.0 g) are summarized in Table 4.

TABLE 4

| Catalyst | Rate (mmole · gram-catalyst$^{-1}$ · hr$^{-1}$) | Yield (%) |
|---|---|---|
| NR50 | 68 | 32 |
| Porous Catalyst | 510 | 92.8 |

EXAMPLE 19

Preparation of Porous Sulfonic Acid Catalyst

The product was prepared as in Example 1 using 60 g perfluorinated sulfonyl fluoride polymer, and 150 g sulfur dioxide. The conditions were 250° C. for 3 hours, cooled to 200° C., then the sulfur dioxide was vented. The plug of polymer was pressed to break any closed cells, cut into small chunks, and fed into a Wiley mill at room temperature. The ground product was converted to the free acid by treatment with 30% dimethylsulfoxide, 14% potassium hydroxide, and 56% water for 3 days at room temperature followed by 2 hours of heating in a hot water bath. The product was washed with water and converted to the free acid with 15% HNO$_3$. Weight after air drying is 57 g. Bulk density was measured to be approximately 0.35.

What is claimed is:

1. An unsupported solid acid catalyst comprising porous highly fluorinated acidic polymer, said catalyst comprising at least about 90 wt. % highly fluorinated acidic polymer and having a surface area of about 0.01 m$^2$/g to about 5 m$^2$/g.

2. The solid acid catalyst of claim 1 having a bulk density of about 0.1 to 0.9 g/cc.

3. The solid acid catalyst of claim 1 wherein the catalyst is substantially free of pores having a size of about 1.7 to about 300 nm as measured by the BET absorption method.

4. The solid acid catalyst of claim 1 comprising at least about 95 wt. % highly fluorinated acidic polymer.

5. The solid acid catalyst of claim 1 having a resiliency factor of 80%.

6. The solid acid catalyst of claim 1 wherein said catalyst is dimensionally stable.

7. The solid acid catalyst of claim 1 wherein said highly fluorinated acidic polymer comprises highly fluorinated sulfonic acid polymer.

8. A process for making an unsupported solid acid catalyst comprising:

exposing highly fluorinated acidic polymer or precursor thereof to a pressurized fluid to produce fluid-swelled polymer or polymer precursor;

heating said fluid-swelled polymer or polymer precursor to a temperature above the softening point of said fluid-swelled polymer or precursor;

reducing the pressure of said pressurizing fluid sufficiently quickly that gases escape from said fluid-swelled polymer, said escaping gases expanding said polymer or polymer precursor into a porous structure; and cooling said polymer or polymer precursor to at least partially retain said porous structure.

9. The process of claim 8 wherein said polymer is high fluorinated sulfonyl halide polymer and said fluid is selected from the group consisting of SO$_2$ and CO$_2$.

10. The process of claim 8 wherein said polymer is highly fluorinated sulfonic acid polymer and said fluid is selected from the group consisting of SO$_2$ and CO$_2$, said fluid further comprising water.

11. The process of claim 8 wherein said cooling of said polymer or polymer precursor to at least partially retain said porous structure is cooling caused by said reduction in pressure.

* * * * *